United States Patent
Ukkola et al.

(10) Patent No.: US 9,015,284 B2
(45) Date of Patent: Apr. 21, 2015

(54) METHOD, APPARATUS AND SYSTEM FOR ADDRESSING RESOURCES

(71) Applicant: Sensinode Oy, Oulu (FI)

(72) Inventors: Sampo Ukkola, Oulu (FI); Zachary Shelby, Oulu (FI); Szymon Sasin, Oulu (FI)

(73) Assignee: Arm Finland Oy, Oulu (FI)

( * ) Notice: Subject to any disclaimer, the term of this patent is extended or adjusted under 35 U.S.C. 154(b) by 223 days.

(21) Appl. No.: 13/711,706

(22) Filed: Dec. 12, 2012

(65) Prior Publication Data

US 2013/0198340 A1 Aug. 1, 2013

(30) Foreign Application Priority Data

Dec. 21, 2011 (FI) .................................... 20116299

(51) Int. Cl.
*G06F 15/16* (2006.01)
*H04L 12/24* (2006.01)
*H04L 29/08* (2006.01)
*H04W 4/00* (2009.01)

(52) U.S. Cl.
CPC ................ *H04L 41/00* (2013.01); *H04L 67/02* (2013.01); *H04L 67/12* (2013.01); *H04W 4/005* (2013.01); *H04W 4/006* (2013.01)

(58) Field of Classification Search
CPC ............................. H04L 67/02; H04W 4/005
USPC ................................................. 709/217–219
See application file for complete search history.

(56) References Cited

U.S. PATENT DOCUMENTS

| | | | |
|---|---|---|---|
| 2004/0133640 A1 | 7/2004 | Yeager et al. | |
| 2006/0265508 A1 | 11/2006 | Angel et al. | |
| 2007/0118496 A1 | 5/2007 | Bornhoevd et al. | |
| 2008/0046593 A1* | 2/2008 | Ando et al. | 709/245 |
| 2008/0301562 A1* | 12/2008 | Berger et al. | 715/733 |
| 2010/0103878 A1 | 4/2010 | Fujiwara et al. | |

FOREIGN PATENT DOCUMENTS

EP   1 863 316 A2   12/2007
WO   2010/055209 A1   5/2010

OTHER PUBLICATIONS

"RDF Schema", Wikipedia-article [online], Nov. 29, 2011.
Finnish Search Report dated Sep. 10, 2012.

* cited by examiner

*Primary Examiner* — Mohamed Wasel
(74) *Attorney, Agent, or Firm* — Barnes & Thornburg LLP (57) ABSTRACT

A method and an apparatus for addressing resources. The apparatus includes a component for forming a group having one or more end-points or other groups and for creating a first abstract universal resource identifier (URI) for the group, the abstract URI includes a domain name and a group identifier; a component for creating a second abstract universal resource identifier (URI) for the end-points, the abstract URI having an end-point and domain name; and a component configured to receive a look-up URI, the look-up URI having tag identifying the look-up URI as a group look-up, the address of the apparatus, optional domain and group parameters; and a component configured to resolve the look-up URI to one or more first or second abstract URIs.

19 Claims, 7 Drawing Sheets

METHOD, APPARATUS AND SYSTEM FOR ADDRESSING RESOURCES

CROSS REFERENCE TO RELATED APPLICATIONS

This patent application claims priority to Finnish Patent Application No. 20116299, filed 21 Dec. 2011, the disclosure of which is incorporated herein by reference in its entirety.

FIELD

Disclosed embodiments relate to a method, an apparatus and a system for addressing resources. In particular, disclosed embodiments relate to addressing resources and web services in networks comprising machine-to-machine systems.

BACKGROUND

The following description of background art may include insights, discoveries, understandings or disclosures, or associations together with disclosures not known to the relevant art prior to the present disclosure but provided by the disclosure. Some of such contributions may be specifically pointed out below, whereas other such contributions will be apparent from their context.

In modern communication and computer networks, data exchange between programs and computers is a vital element. Different programs, computers and processors exchange data without human intervention. This kind of communication is usually called machine-to-machine (M2M) communications.

An example of a network technology where M2M communication is widely applied is a low-power wireless network, such as an IEEE 802.15.4 based embedded and sensor network.

Applications running in devices connected to the Internet may need information provided by M2M devices. Traditional addressing method of using and processing Universal Resource Identifiers has certain problems when used in M2M networks comprising many end-points. Existing Internet protocols using universal resource identifier (URI) schemes resolve just the FQDN (Fully Qualified Domain Name) part of a Universal Resource Locator URL into an Internet Protocol (IP) address. For example, if the URL is coap://node.example.com/path, the resolved part would be node.example.com. The Domain Name System DNS resolves the URL into a point-to-point address. A single DNS mapping can be made to return multiple IP addresses but this feature is used to load balancing purposes where the multiple addresses point to the same service.

SUMMARY

Disclosed embodiments provide a solution for addressing and accessing resources offered by M2M devices.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

A first disclosed embodiment provides an apparatus, comprising a first interface to communicate with end-points operationally connected to the apparatus using a binary web service, the end-points comprising one or more resources; a second interface for communicating with web applications making use of the resources; a component for forming a group comprising one or more end-points or other groups; a component for creating a first abstract universal resource identifier (URI) for the group to be used over the second interface, the abstract URI comprising a domain name and a group identifier and being independent of the protocol used to access the resources of the end-points of the group; a component for creating a second abstract universal resource identifier (URI) for the end-points to be used over the second interface, the abstract URI comprising an end-point and domain name and being independent of the protocol used to access the end-point; a component configured to receive over the second interface a look-up URI, the look-up URI comprising tag identifying the look-up URI as a group look-up, the address of the apparatus, optional domain and group parameters; and a component configured to resolve the look-up URI to one or more first or second abstract URIs.

A second disclosed embodiment provides a system, comprising a server and one or more end-points operationally connected to the server using a binary web service, the end-points comprising one or more resources, a first interface in the server to communicate with end-points operationally connected to the apparatus using a binary web service, the end-points comprising one or more resources; a second interface in the server for communicating with web applications making use of the resources; a component in the server for forming a group comprising one or more end-points or other groups; a component in the server for creating a first abstract universal resource identifier (URI) for the group to be used over the second interface, the abstract URI comprising a domain name and a group identifier and being independent of the protocol used to access the resources of the end-points of the group; a component in the server for creating a second abstract universal resource identifier (URI) for the end-points to be used over the second interface, the abstract URI comprising an end-point and domain name and being independent of the protocol used to access the end-point; a component in the server configured to receive over the second interface a look-up URI, the look-up URI comprising tag identifying the look-up URI as a group look-up, the address of the apparatus, optional domain and group parameters; and a component in the server configured to resolve the look-up URI to one or more first or second abstract URIs.

A third disclosed embodiment provides a method, comprising communicating over a first interface with end-points operationally connected to the apparatus using a binary web service, the end-points comprising one or more resources; communicating with web applications making use of the resources over a second interface; forming a group comprising one or more end-points or other groups; creating a first abstract universal resource identifier (URI) for the group to be used over the second interface, the abstract URI comprising a domain name and a group identifier and being independent of the protocol used to access the resources of the end-points of the group; creating a second abstract universal resource identifier (URI) for the end-points to be used over the second interface, the abstract URI comprising an end-point and domain name and being independent of the protocol used to access the end-point; receiving over the second interface a look-up URI, the look-up URI comprising tag identifying the look-up URI as a group look-up, the address of the apparatus, optional domain and group parameters; and resolving the look-up URI to one or more first or second abstract URIs.

A fourth disclosed embodiment provides a method, comprising communicating with a server operationally connected to a number of end-points using a binary web service, the end-points comprising one or more resources; sending to the server over an interface a look-up universal resource identifier (URI), the look-up URI comprising tag identifying the look-up URI as a group look-up, the address of the server, optional domain and group parameters; the group comprising one or more end-points or other groups receiving, after an unspecified time-out, one or more first abstract universal resource identifiers (URI) of a group and/or one or more second abstract universal resource identifiers (URI) of an end-point, the first abstract URI comprising a domain name and a group identifier and being independent of the protocol used to access the resources of the end-points of the group and the second abstract URI comprising an end-point and domain name and being independent of the protocol used to access the end-point.

Disclosed embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

Figure 1:
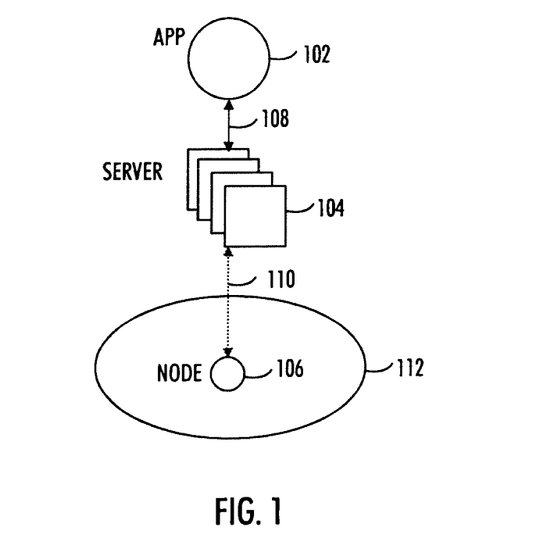
FIG. 1 illustrates an example of a system architecture to which disclosed embodiments may be applied.

FIG. 1 illustrates an example of a web service system architecture to which disclosed embodiments may be applied. In at least one disclosed embodiment, the system is configured to efficiently enable one or more backend web applications 102 to make use of constrained embedded nodes 106 over constrained networks 112. The communication is based on IP and a RESTful web service architecture end-to-end. Furthermore, unlike prior art systems that use full web services end-to-end, the proposed system is more efficient and scalable—also being applicable to a much wider range of devices and networks at a lower cost and batter consumption.

The architecture consists of a server 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000s of nodes) to very large M2M systems (100s of millions of nodes).

The server 104 provides a web service interface 108 to web applications 102 that make use of embedded node resources. The web application may be application run in a browser or in standalone software. The application or software may be run in an apparatus capable of Internet communication. The server is configured to communicate using optimized embedded web service algorithms and protocols with end-points or nodes 106 over the M2M interface 110. The architecture includes the ability to cluster the backend server across multiple physical or virtual machines (called private or public cloud computing).

The constrained end-points or nodes 106 in the system have limited memory and processing capabilities, may sleep most of the time, and often operate using a constrained network technology 112. Nodes communicate with local proxies or servers using an M2M interface 110. Each node contains resource registration related functionality among other things. The nodes comprise one or more resources which may be utilized by the web applications.

The embedded M2M devices or nodes 106 can be connected to the server 104 via IP either directly or via the proxy (not shown). The interface between the nodes and the server 104 are realized using a binary web service protocol over IP. The M2M devices 106 reside in a constrained network 112 over which traditional protocols would be too inefficient. The constrained or low-power wireless network may be a multi-hop network comprising a set of wireless low-power nodes. In this simplified example, one node 106 is illustrated.

In at least one disclosed embodiment, the wireless links in the wireless network 112 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
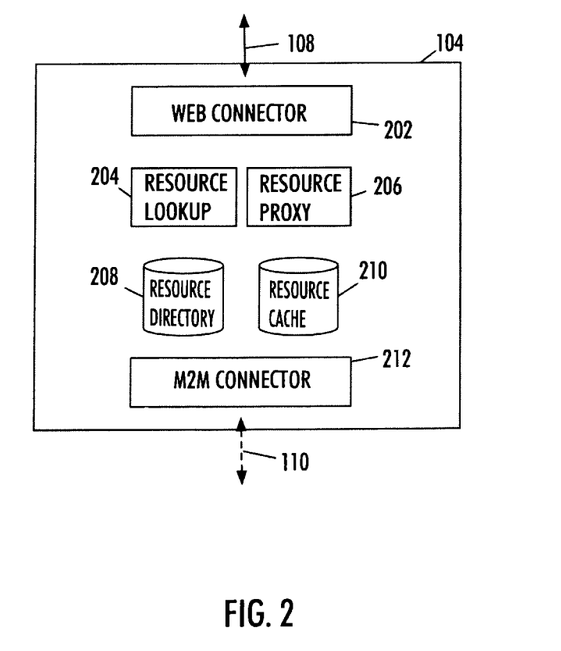
FIG. 2 illustrates an example of a server.

FIG. 2 illustrates an example of a server 104. The server may consist of several components. The server comprises a binary M2M interface 110 to communicate with nodes or end-points operationally connected to the server using a binary web service (binary web protocol and payload) for example with the CoAP protocol. Other protocols such as SMS or optimized HTTP are also supported. Each protocol is realized in the server using an M2M connector 212.

The server may be used by one or more web applications 102 over a web interface 108. The interface 108 is typically realized over HTTP with XML or JSON payload content where JSON (JavaScript Object Notation) is a known data-interchange format. Mentioned realizations are merely examples as the architecture of the server is transparent to payload type. In at least one disclosed embodiment, the interaction of the web applications with the server over the interface 108 uses the REST paradigm. Alternative protocols may be supported, e.g. JMS (Java Message Service) for communication with enterprise Java components, or CoAP when efficiency is needed e.g. when communicating with mobile devices. The server may comprise a web connector 202 for each protocol supported by the interface. The web connectors realize abstract REST interfaces used by the other server components to access the different protocols available. This makes it possible for to support a new protocol without changing other server components.

The M2M Connector 212 and the web connector 202 may be realized with one or more processors and associated software or by discrete circuitries.

The server further comprises a Resource Directory 208. The server is configured to receive registrations of constrained nodes or end-points 106 operationally connected to the server. The end-points or nodes and their web resources (path) along with other meta-data are registered with the Resource Directory either directly by the node or by another third party. Thus, the Resource Directory is a registry of the resources below the server in the M2M network. This way the Resource Directory eliminates the need for management tools to probe the M2M network directly (which is very inefficient). The Resource Directory may be realized using a processor and a storing device such as a hard disc drive and a suitable application, for example. The Resource Directory may be realized as a database application in a computer or it may be realized using cloud computing.

The server further comprises a Resource Cache 210. The Resource Cache is a temporary cache of the most recent representation (latest payload value) of node resources. The cache 210 is accessed any time the server receives a request for a resource. The cache is updated any time a response is made. This caching greatly improves efficiency as subsequent requests for that resource are fetched internally rather than loading the constrained M2M network. The Resource Cache may be realized as an application in a computer or it may be realized using cloud computing.

In at least one disclosed embodiment, the server comprises a Resource Lookup 204 which is configured to provide a lookup interface for web applications 102 and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 210. The Resource Proxy is first configured to check if a local cached copy of the requested resource is available. If a valid copy is found, it may be sent as a reply. If the cache does not have a copy of the resource it is requested from the node via an M2M Connector 212. The Resource Lookup and Resource Proxy may be realized using a processor and a storing device such as a hard disc drive and a suitable application, for example. They may be realized as applications in a computer or using cloud computing.

In at least one disclosed embodiment, the server may inform the web applications of available end-points and resources.

In at least one disclosed embodiment, the server is configured to form groups comprising one or more end-points or other groups. The server may assign an end-point name to the group and store the data in the Resource Directory 208. Thus the group looks like any other end-point and is identified by the authority form end-point.domain. However, in the Resource Directory the group end-point actually points to one or more other end-point entries within the Resource Directory. In turn, some of these end-points may be groups. Thus there can be multiple levels of groups (called nested groups). The server comprises a mechanism to allow a group to be looked up, returning its membership, to allow a proxy request on a group causing a batch request to be performed, along with a mechanism to return the resulting responses of that batch operation in an efficient way. In addition, a configuration interface is provided for managing group membership. The group feature makes resource look-up more useful for many web applications and allows the applications to perform batch requests on resources held by members in a group.

In at least one disclosed embodiment, the server is configured to create, modify or delete a group on the basis of a request received from the web application.

Figure 3:
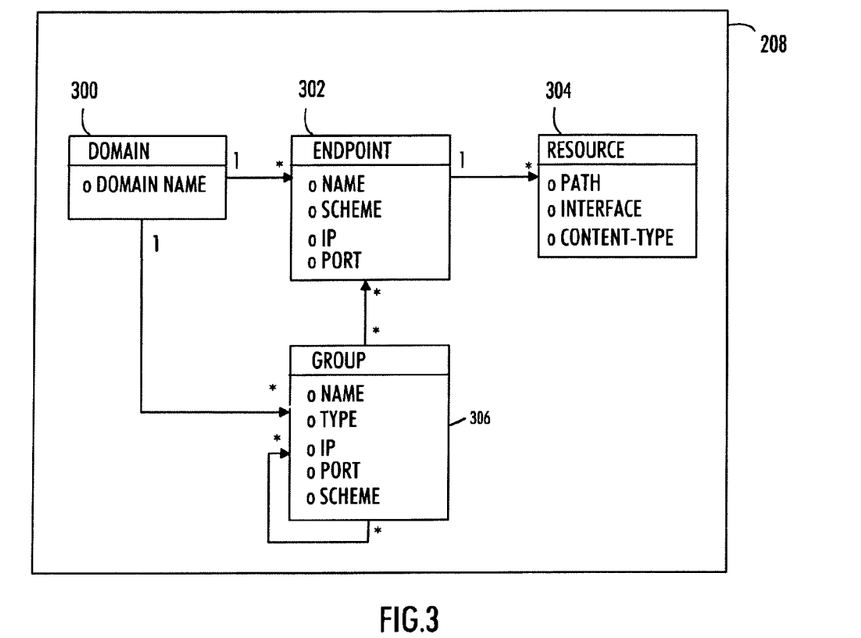
FIG. 3 illustrates an example of how data is stored in the Resource Directory data base.

FIG. 3 illustrates an example of how group data is stored in the Resource Directory 208 data base. The Resource Directory data base comprises domains 300 as main level elements. Each domain 300 can contain multiple end-points 302 and groups 306. Each end-point 302 can have multiple resources 304. Each domain can also have multiple groups 306. A single group 306 can contain end-points 302 or other groups 306.

In at least one disclosed embodiment, data for each end-point 302 comprises the name of the end-point, the scheme to be used to access the end-point, the IP address and port of the end-point. In a similar manner, data for each group 306 comprises the name of the group, scheme to be used to access the group, and type of the group. In at least one disclosed embodiment, the group may have an associated group address (e.g. an IPv6 multicast address). In such a case the stored data comprises the IP address and port of the group. Data for each resource 304 comprises the path of the end-point, the interface and content types of the resource.

Figure 4:
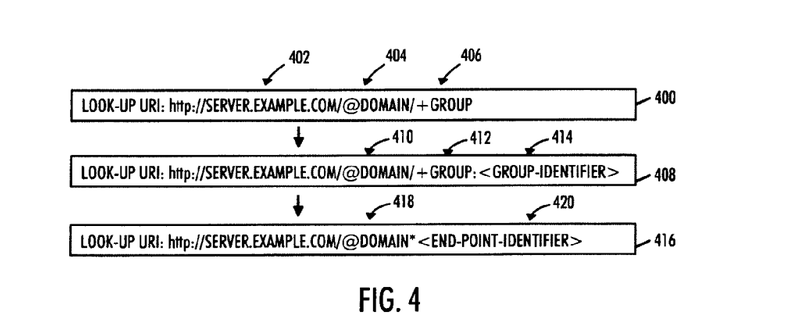
FIG. 4 illustrates an example of different stages of a look-up process.

FIG. 4 illustrates an address mechanism supporting groups. In at least one disclosed embodiment, a tag in an address may be used to denote that the address relates to a group of end-points and/or other groups. For example, the tag may be in the form +group:<group-identifier>, where <group-identifier> is the name of a group or some other group related parameter. The tags may be used when a web application 102 performs a look-up of resources from a server 104.

FIG. 4 shows the different stages of the look-up process supporting this group mechanism. Assume that a web application wishes to get information on the groups available from a particular domain. The web application may 102 send a request or look-up URI 400 to the server 104. The look-up URI comprises the address 402 of the server, the @domain segment 404 followed by a +group segment 406.

The server resolves the look-up URI and the result is a list of URIs of the form 408. The server returns an URI for each group in the domain. The abstract URI 408 comprises the domain name 410 followed by group identifier comprising a group tag 412 and the group identification 414 identifying the particular group.

The web application may request more information about the members of each group by sending a look-up URI request of the form 408 to the server, the request comprising the +group:<group-identifier> segment 412, 414. The Resource Directory 208 of the server is configured to resolve the look-up URI, and return a list of URIs, one for each end-point or group that belongs to the requested group <group-identifier>. For each end-point an abstract URI of the form 416 is returned. The abstract URI comprises the domain 418 and end-point identification 420. In addition, the Resource Directory 208 of the server returns an URI of the form 406 for each group that is a member of the requested group <group-identifier>. The described mechanism allows for group recursion, and a group may belong to other groups. A limit may be placed on the depth of groups allowed to avoid infinite loops.

Some examples of these look-up URIs are provided next. The server address is omitted from the URIs for simplicity. When a web application wishes to get information on groups in domain "Nordic", it sends following look-up URI to the server:
GET /@nordic/+group
The server resolves the URI and responds by sending following URIs to the web application:

/@nordic/+group:finland
/@nordic/+group:sweden
/@nordic/+group:norway
/@nordic/+group:denmark Here, the web application gets the information that the domain "Nordic" comprises four groups, "finland", "sweden", "norway" and "denmark".

Assume that the web application wishes to get information on the members of the group "finland". It sends following look-up URI to the server:
GET /@nordic/+group:finland
The server resolves the URI and responds with the following list of URIs:

/@nordic*fixed1
/@nordic*fixed2
/@nordic*fixed3

Here, the web application gets the information that the group "finland" comprises three end-points, "fixed1", "fixed2" and "fixed3". Assume that the web application wishes to get information on the end-point "fixed1". It sends following look-up URI to the server:
GET /@nordic*fixed1
The server responds by sending the abstract URIs of the resources of the end-point "fixed1":

/@nordic*fixed1/temperature
/@nordic*fixed1/light
/@nordic*fixed1/humidity

The server may request information whether any of the resources of the end-point "fixed1" has metadata "degC" by sending request
GET /@nordic*fixed1?rt=degC.
The server may reply by sending following
/@nordic*fixed1/temperature.
This indicates that the end-point "fixed1" has a resource "temperature" which is associated with metadata "degC".

In at least one disclosed embodiment, a more advanced mode of look-up may be utilized. In this disclosed embodiment, the results of requests are returned as JSON objects instead of returning simple links. These objects encompass more recursive information, and require fewer requests in order to perform the look-up. The web application may indicate that it requests a reply in this mode by including a pre-determined query parameter in the request (left out of the following examples for brevity). Examples using this mode:

A web application requests information on group "power-meters" by sending following look-up URI:
GET /@mydomain/+group:power-meters
The server resolves the request and replies with following JSON object:

```
200 OK
{
  "groups":{
    "group":[
      {
        "name":"power-meter-group5"
      },
      {
        "name":"power-meter-group2",
        "description":"info that helps identifying this group"
      },
      {
        "name":"power-meter-group3"
      }
    ]
  }
}
```

The reply indicates that the group "power-meters" comprises three groups. The web application requests more information on group "power-meter5" by sending following look-up URI:
GET /@mydomain/+group:power-meter-group5
The server resolves the request and replies with following JSON object:

```
200 OK
{
  "endpoints":{
    "endpoint":[{
      "name":"endpoint1",
      "resources":{
        "resource":[{
          "uri":"/temp",
          "rt":"#eeh"
        }]
      }
    }]},
    "groups":{
      "group" :[{
        "name":"power-meter-group3"
      }]
    }
}
```

Thus, the group "power-meter5" comprises as members en end-point "end-point1" and a group "power-meter3". By sending the reply as a JSON object the server may include more information to the reply compared to a reply comprising simple links. Above, the reply comprises information on the resources of the end-point "endpoint1". The end-point comprises a resource "/temp".

While the GET method may be used to look-up members of groups, other methods may be used to create (POST), modify (PUT) and remove (DELETE) groups.

For example, the following method creates a new group "mygroup" that contains the end-point "light-sensor6" and the group "my-internal-group":

```
POST /@domain/+group:mygroup/
{
    "description":"light sensors on the east side of the building",
    "endpoints":{
        "endpoint":[
            {
                "name":"light-sensor6"
            }
        ]
    },
    "groups":{
        "group":[
            {
                "name":"my-internal-group"
            }
        ]
    }
}
201 CREATED
```

PUT method may be used in a similar way to update the contents of a group.

A DELETE method is used to remove particular end-points and groups from a group, as in the next example. The entire group would be removed without the query string parameter:

```
DELETE/@domain/+group:mygroup/?=group=group1,
group2,group3&endpoint=endpoint1,endpoint2,endpoint3
200 OK.
```

Figure 5:
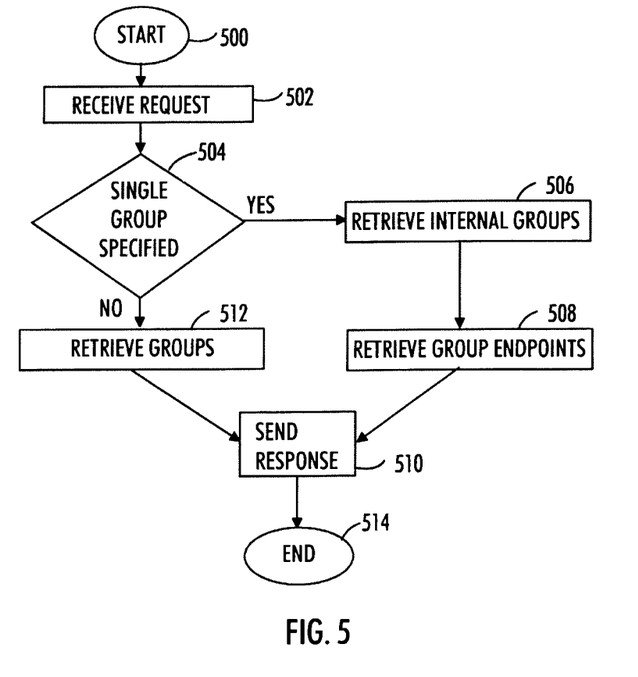
FIG. 5 is a flowchart illustrating an example of group look-up process.

FIG. 5 is a flowchart illustrating group look-up. The process starts at step 500.

In step 502, a server receives a group lookup request through web connector 108.

In step 504, the server is configured to determine if the request has a group specified as retrieval target.

If so, the possible internal groups are retrieved from Resource Directory data base 208 in step 506. If the group does not contain groups as members nothing is done.

In step 508, the endpoints associated with the group are also retrieved from Resource Directory data base 208. If the group does not contain end-points as members nothing is done.

In step 510, the retrieved internal groups and end-points are returned through the web connector. Information on the groups may be sent as abstract URIs of the form 408. Information on the end-points may be sent as abstract URIs of the form 416.

If it is detected in step 504 that the group request does not have a group defined, all groups under the domain mentioned in the request are retrieved in step 512 and group information is returned as response in step 510. The reply may comprise one or more abstract URIs of the form 408.

Figure 6A:
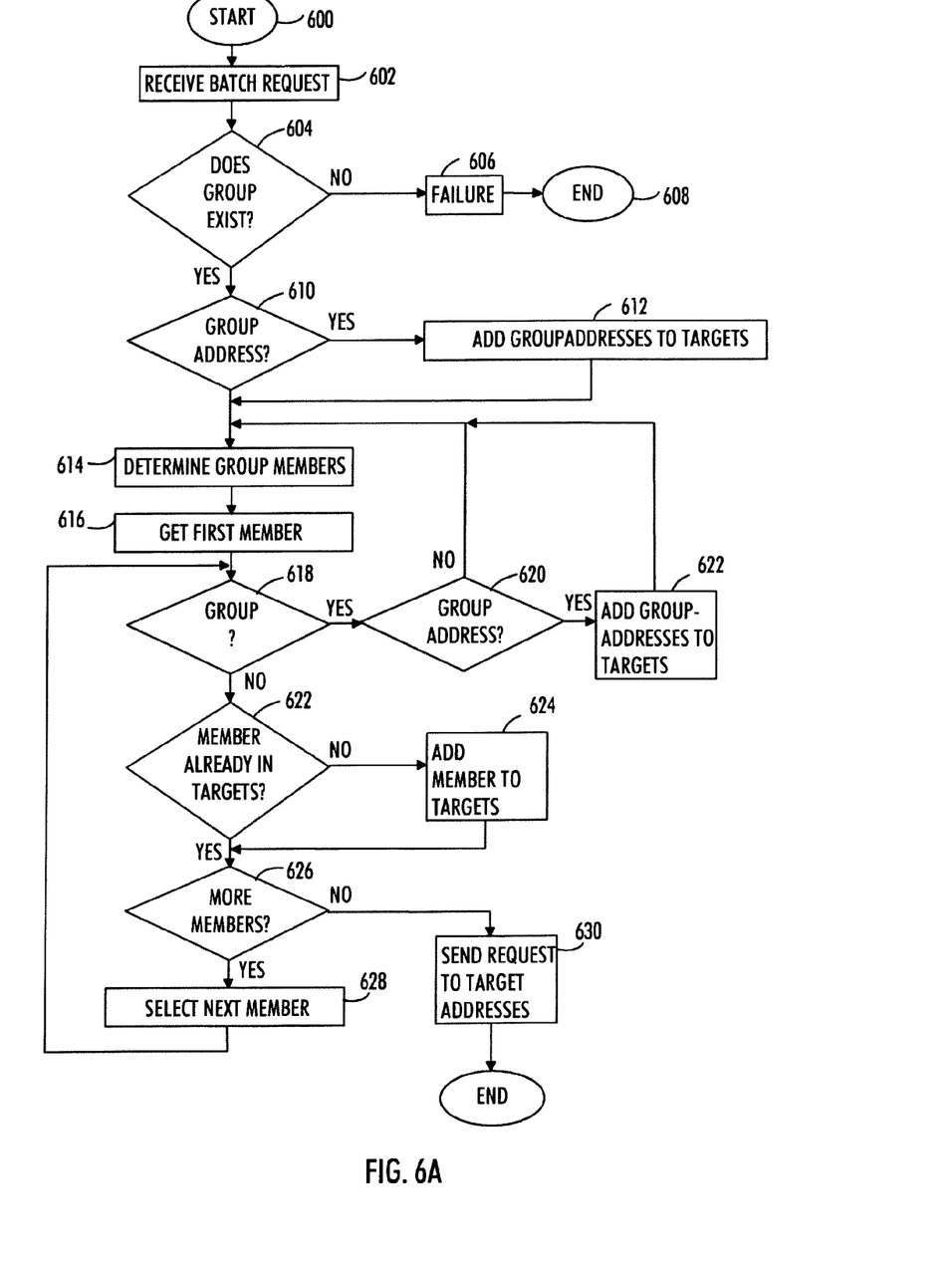
FIG. 6A is a flowchart illustrating an example of processing a group request.
Figure 6B:
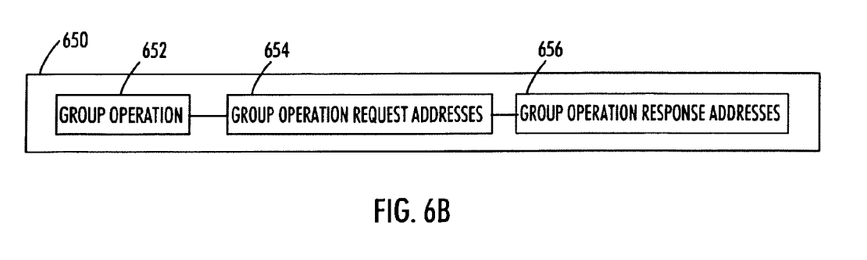
FIG. 6B illustrates address mapping.

The process end in step 514.

Where the above disclosed look-up interface is used to resolve groups and manage group membership, a proxy interface 206 is provided to make batch requests to the resources held by the members of a group. This proxy interface is configured to detect a group related request when the group tag is a segment of the request URI. When this group tag is present, the server is configured to perform the batch request resolution described below in association with FIGS. 6 and 7.

Web transfer protocols like HTTP are only designed to receive a single response to a request, and thus standard HTTP would not be able to handle the responses to a batch request, which would include a REST response for each end-point. Disclosed embodiments solve this problem by returning a JSON object containing an array of REST responses that resulted from the request. This same response mechanism can also be used with other protocols used to implement the proxy interface such as JMS.

Let us consider an example where a GET request is sent to all group end-points that have /sensor/power resource:
GET /proxy/+group:mygroup/sensor/power The above request is resolved by the server and it results in a JSON object with an array of the responses from each end-point. Similarly a batch POST, PUT or DELETE operation could be performed.

```
200 OK
{
    "uri":"/sensor/power",
    "content":[
        {
            "endpoint":"sn202",
            "response_code":"200",
            "headers":[
                {
                    "ETag":"qwrtqwt262"
                }
            ],
            "body":""
        },
        {
            "endpoint":"sn203",
            "response_code":"200",
            "body":"123512724572427"
        },
        {
            "endpoint":"sn205",
            "response_code":"404"
        },
        {
            "endpoint":"sn208",
            "response_code":"202"
        }
    ]
}
```

Figure 7:
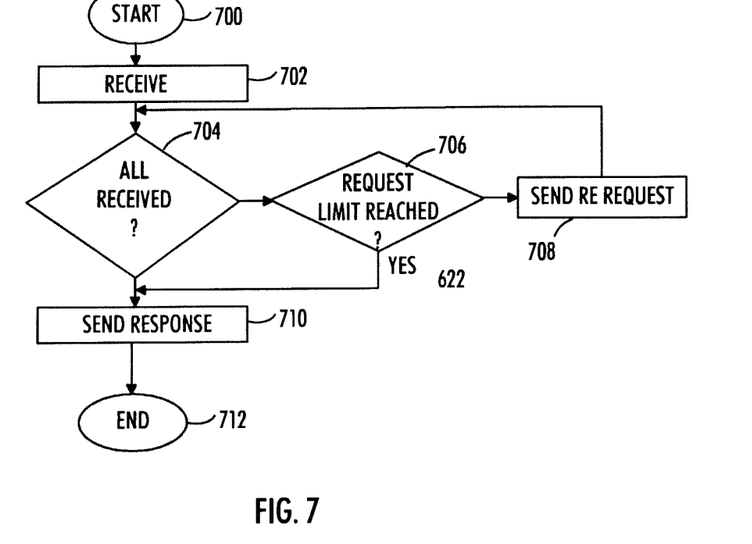
FIG. 7 is a flowchart illustrating an example of processing a group request.

FIGS. 6A and 7 are flowcharts illustrating an example of the processing of a group request at the server 104. The process starts at step 600.

The purpose of the process is to send the request to all members of the group designated in the request, receive responses from the members and send a reply to the sender of the request. The server receiving the request must resolve the members of the group, note the addresses of the members, send the request to the members, determine if all members receive and reply to the request. The addresses of the members to receive the request are in following called target addresses. The server is configured to keep a list of those addresses receiving the request and from which a reply is expected.

FIG. 6B illustrates the address mapping 650. Regarding a given group operation such as a group request 652, the server may be configured to maintain two registers regarding group related addresses. First the server keeps a register 654 of addresses of the members to receive the request. These addresses are above called target addresses. This address register may comprise both group addresses and end-point addresses. Second, the server may keep a register 656 of the addresses from which a reply is expected. This address register may comprise end-point addresses. The end-points belonging to the group addresses of register 654 are listed here using the end-point address of each end-point. In at least one disclosed embodiment, these registers are stored in the Resource Directory as a database. The registers may as well be stored in a memory and not stored in any data base as they may be stored only as long as the group operation lasts and deleted when the operation has been completed. The storing method of the registers is not relevant regarding the disclosed embodiments.

In step 602, the server 104 receives a group request. The request is recognized as a group request of a group related tag or group identification. The request may comprise optional parameters.

In step 604, the server checks system the existence of the group.

If a non-existing group is addressed the operation fails, a negative response 606 is sent to the sender of the request and the process ends in step 608.

In step 610, the group information is checked. If a group has an associated group address (e.g. an IPv6 multicast address) in the Resource Directory, the group address is added as a target address to the address mapping in step 612.

In step 614, the group members are determined. The members may be retrieved from the Resource Directory data base.

The group members are checked one by one. In step 616, the first member is selected.

In step 618 it is checked whether the member is a group.

If the member is a group, the process continues by checking if the group has an associated group address in step 620. If so, the group address is added as a target address to the address mapping in step 622. The process continues recursively in step 614 where the group members are determined and processed.

If the member was not a group, the server is configured in step 623 to check whether the member is already in the target addresses. If not, the address of the member is added as a target address to the address mapping in step 624.

Otherwise, the process continues in step 626 by checking whether there are more members in the group.

Is so, the next member is selected in step 628 and the process continues in step 618 as described above.

If all members of the group have been processed the process continues in step 630 where the request is sent to all target addresses. The addresses may be IP addresses of individual end-points or associated group address or addresses.

The process ends.

The requests are sent through the m2m interface 110. The server is configured to expect responses from the group, individual end-points or subgroups. FIG. 7 illustrates an example of the processing of the responses. In general, a request can be considered finished once all of its child endpoints have responded or error condition has occurred for a request/response combination.

The process ends in step 700.

In step 702, the server receives responses from the group. The responses may arrive at different time instants. In at least one disclosed embodiment, a given time-out may be given for the responses.

In step 704, the server is configured to check whether a response has been received from all target addresses.

If not, the server checks in at least one disclosed embodiment in step 706 whether a retransmission limit has been reached. If not, the server may retransmit in step 708 the request to those target addresses than have not sent a response. The process continues in step 704.

If all responses have been received or retransmission limit has been exceeded the server is configured to send a response in step 710 to the sender of the request. The response may comprise the replies received from the target addresses and error messages related to the addresses from which a reply was not received.

The process ends in step 712.

Figure 8:
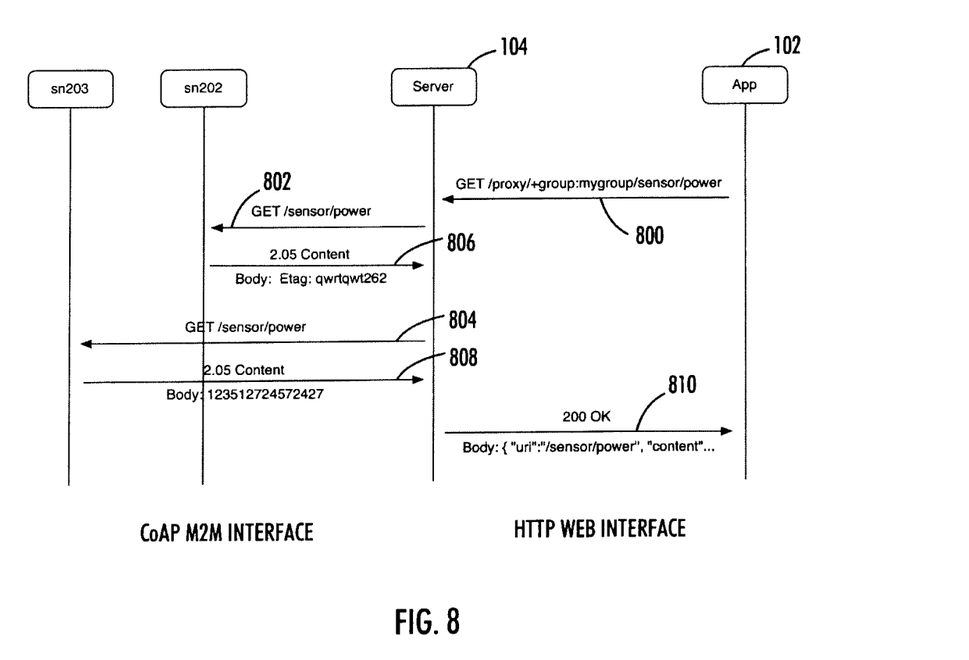
FIG. 8 is a message diagram illustrating a batch proxy request.

FIG. 8 is a message diagram illustrating a batch proxy request. Here a web application 102 forms a batch request by placing the +group:mygroup tag as a segment in an URI and making a GET request 800 to the server 104.

The server 104 then performs the batch resolution described above in association with FIG. 6 and proceeds to make a request 802, 804 to each address resulting from that process. In this example two end-points sn203 and sn202 belong to the group. This could also be one or more multicast addresses. Once the response 806, 808 from each address is received, or times out after a configured timeout (this can be set by the web application in the request 800), the server responds 810 with the JSON Object batch format described above, which Object includes an entry for each end-point.

Figure 9A:
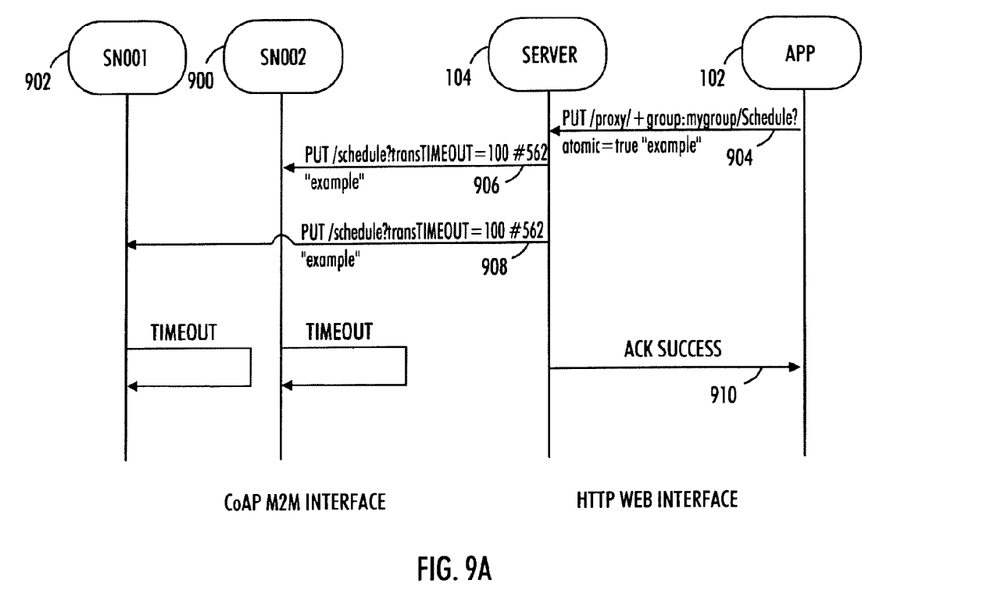
FIGS. 9A, 9B and 9C are message diagrams illustrating batch proxy requests.

FIG. 9A is a message diagram illustrating a batch proxy request. In at least one disclosed embodiment, a web application 102 may need to make sure that all end-points receiving the request perform the requested operation at the same time. For example a given measurement should be made simultaneously, or given equipment turned on at the same time. In this example there are two end-points 900, 902 forming a group.

The web application sends a given request 904 to the server 104, where the request comprises the group tag designating the group of the end-points 900, 902 and a predetermined tag indicating that the request should be received simultaneously by the group members. In this example the predetermined tag is "atomic=true".

The server receives the request and is configured to detect the predetermined tag. On the basis if the predetermined tag, the server determines the timing differences between the members of the group and sends the requests 906, 908 to the end-points with a given time-out parameter. The time-out parameter instructs the receiving end-point to wait for the given time-out before executing the request. By selecting the time-outs of the requests of the different group members appropriately the server may control the execution of the request. This way the request may be commanded to execute simultaneously in all receiving end-points. Finally, an acknowledgement 910 is sent to the web application.

Figure 9B:
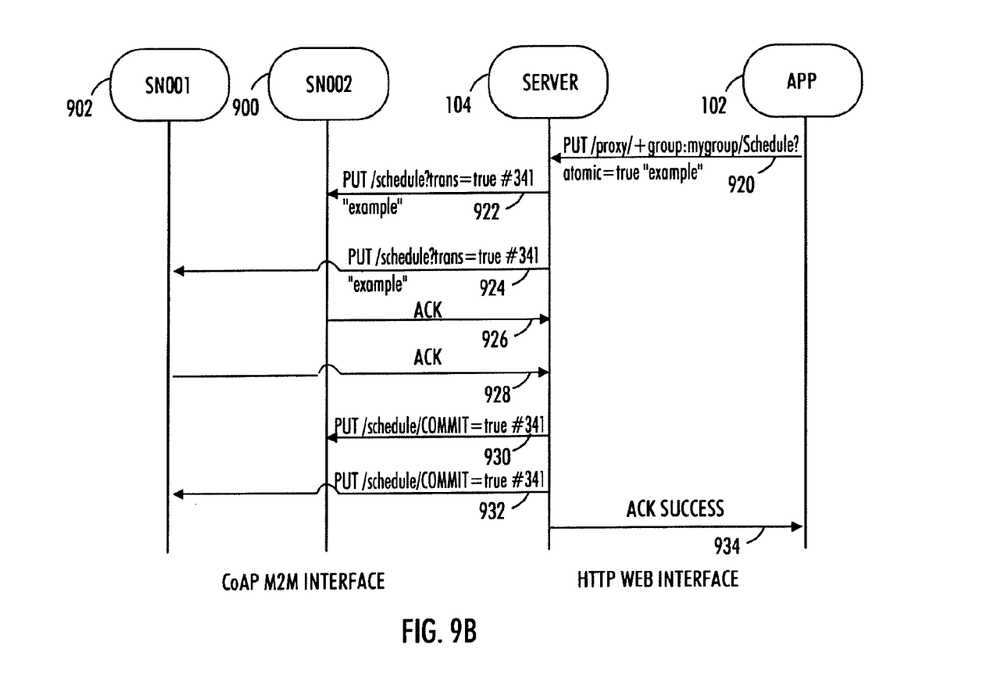

FIG. 9B is a message diagram illustrating a batch proxy request. In at least one disclosed embodiment, a web application 102 may need to make sure that all end-points receive the request before the request is executed. If the request is not received successfully by all recipients the request should not be executed at all. In this example there are two end-points 900, 902 forming a group.

The web application 102 sends a given request 920 to the server 104, where the request comprises the group tag designating the group of the end-points 900, 902 and a predetermined tag indicating that the request should be executed only if all designated end-points have received the request successfully. In this example the predetermined tag is "atomic=true".

The server resolves the batch request and sends the request 922, 924 to the end-points 900, 902. The request comprises a predetermined group tag or group id indicating to the end-points that they should acknowledge the request but not execute it yet.

When the server receives acknowledgements 926, 928 from all the end-points, it is configured to send execute request 930, 932 to the end-points and an acknowledgement 934 to the web application.

Figure 9C:
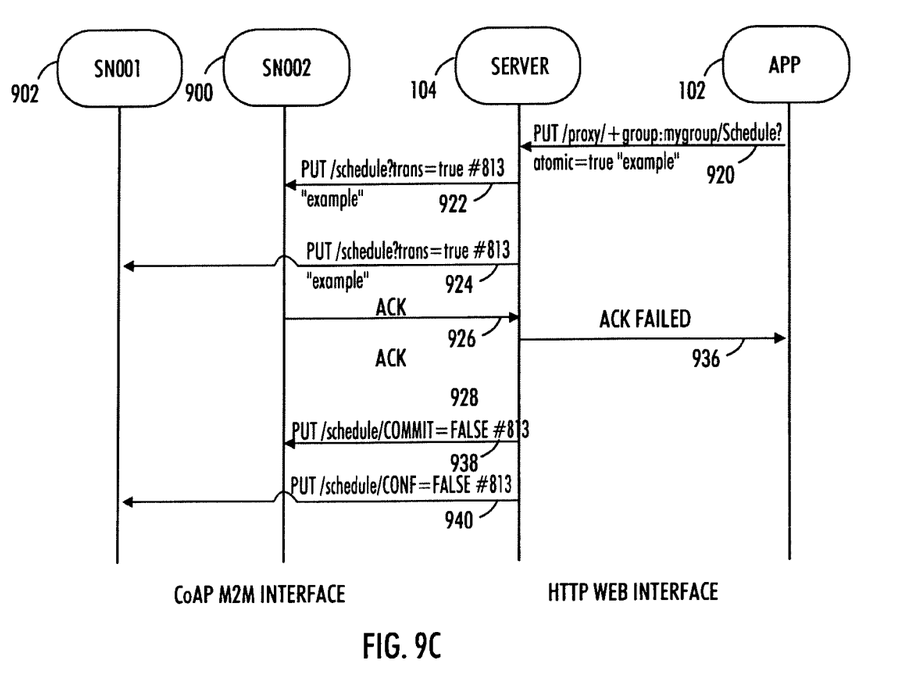

FIG. 9C is a message diagram illustrating a batch proxy request. The Figure illustrates an example where the server fails to receive an acknowledgement from all the end-points. Here, the messages 920, 922, 924 are the same as in FIG. 9B. The server receives an acknowledgement 926 from the end-point 900, but fails to receive an acknowledgement from end-point 902 in a given time.

The server is configured to report 936 failure to the web application and send cancel request 938, 940 to the end-points 900, 902.

Figure 10:
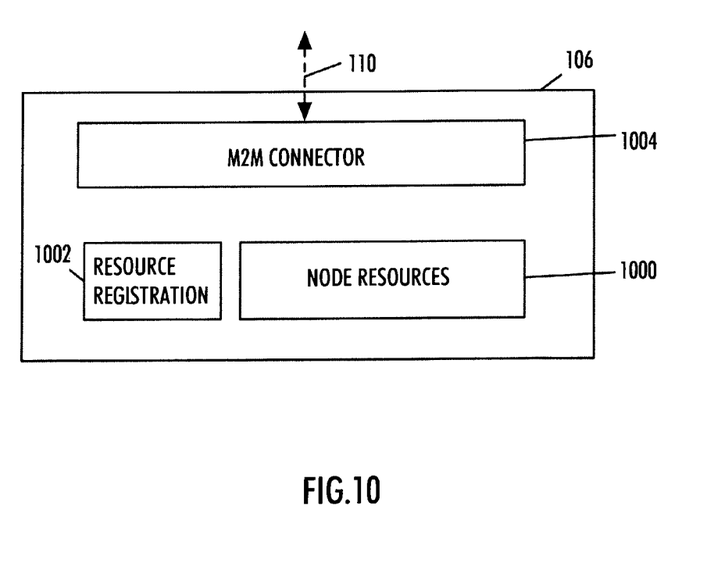
FIG. 10 illustrates an example of an end-point.

FIG. 10 shows an example of the structure of an end-point 106. A end-point or node has one or more device applications, each registering resources with the end-point Resources component 1000. When the resources have been registered, the Resource Registration component 1002 discovers the location of a Resource Directory for its appropriate domain and then registers itself and its resource over the M2M interface 110 using the M2M Connector 1004.

End-point or end-points may have resources of different types registered. A basic type of resource is one which may have a given value. A web application may request the end-point the value (via the server). The end-point is configured to read the value and report it back to the web application (via the server) typically immediately after receiving the request.

In at least one disclosed embodiment, the apparatus may be realized as software in a server, a node or an end-point, a computer or a set of computers connected to Internet and a binary web service domain directly or via a proxy router or server. For example, the Web Connectors 202, M2M Connectors 212, 904, Resource look-up 204 and Resource Proxy 206 components may be realized in software in whole or in part or with electronic circuitries dedicated for the described purposes. Resource Directory 208 and Resource Cache 210 may be realized in software in whole or in part or with memory circuitries known in the art.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

In at least one disclosed embodiment, the apparatus may comprise means for communicating over a first interface with end-points operationally connected to the apparatus using a binary web service, the end-points comprising one or more resources; means for communicating with web applications making use of the resources over a second interface; means for forming a group comprising one or more end-points or other groups; means for creating a first abstract universal resource identifier (URI) for the group to be used over the second interface, the abstract URI comprising a domain name and a group identifier and being independent of the protocol used to access the resources of the end-points of the group; means for creating a second abstract universal resource identifier (URI) for the end-points to be used over the second interface, the abstract URI comprising an end-point and domain name and being independent of the protocol used to access the end-point; means for receiving over the second interface a look-up URI, the look-up URI comprising tag identifying the look-up URI as a group look-up, the address of the apparatus, optional domain and group parameters; and means for resolving the look-up URI to one or more first or second abstract URIs.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
 a first interface to communicate with end-points operationally connected to the apparatus using a binary web service, the end-points comprising one or more resources;
 a second interface for communicating with web applications making use of the resources;
 a component for forming a group comprising one or more end-points or other groups;
 a component for creating a first abstract universal resource identifier (URI) for the group to be used over the second interface, the abstract URI comprising a domain name and a group identifier and being independent of the protocol used to access the resources of the end-points of the group;
 a component for creating a second abstract universal resource identifier (URI) for the end-points to be used over the second interface, the abstract URI comprising an end-point and domain name and being independent of the protocol used to access the end-point;
 a component configured to receive over the second interface a look-up URI, the look- up URI comprising a tag identifying the look-up URI as a group look-up, the address of the apparatus, optional domain and group parameters; and
 a component configured to resolve the look-up URI to one or more first or second abstract URIs.

2. The apparatus of claim 1, wherein the apparatus further comprising:
 a component for creating universal resource locators (URL) for resources of the end-points to be used over the first interface, the URLs comprising the protocol used to access the resource, the Internet Protocol address, port and path of the resource; and
 a component configured to link the URLs and the second abstract URIs together.

3. The apparatus of claim 1, wherein the apparatus is configured to resolve a look-up URI to a linked second abstract URI if the received look-up URI points to a resolvable address, and otherwise to first look-up URL.

4. The apparatus of claim 1, wherein the apparatus is configured to resolve a look-up URI to a JavaScript Object Notation object comprising one or more arrays of responses.

5. The apparatus of claim 1, wherein the apparatus further comprising a component configured to:
 receive over the second interface a request, the request comprising a domain name and a group identifier and optional parameters;
 resolve the members of the group;
 send the request to the members;
 receive response from the members; and
 send a response to the sender of the request.

6. The apparatus claim 5, where the apparatus further comprises a component configured to:
receive a request comprising an indicator that the request should be executed by the members of the group simultaneously;
determine an individual time-out for each member; and
send the request to the members of the group with a time-out instructing each member to execute the request when the time-out has expired.

7. The apparatus claim 5, where the apparatus further comprises a component configured to:
receive a request comprising an indicator that the request should be executed by the members only if all members receive the request;
send the request to the members of the group with a tag or group id indicating to the members that they should acknowledge the request but not execute it yet;
receive acknowledgements from the members; and
send a message to the members to execute the request if all members acknowledged the request.

8. The apparatus of claim 5, wherein the apparatus is configured to send the response to the sender of the request as a JavaScript Object Notation object comprising one or more arrays of responses.

9. A system comprising:
a server and one or more end-points operationally connected to the server using a binary web service, the end-points comprising one or more resources;
a first interface in the server to communicate with end-points operationally connected to the apparatus using a binary web service, the end-points comprising one or more resources;
a second interface in the server for communicating with web applications making use of the resources;
a component in the server for forming a group comprising one or more end-points or other groups;
a component in the server for creating a first abstract universal resource identifier (URI) for the group to be used over the second interface, the abstract URI comprising a domain name and a group identifier and being independent of the protocol used to access the resources of the end-points of the group;
a component in the server for creating a second abstract universal resource identifier (URI) for the end-points to be used over the second interface, the abstract URI comprising an end-point and domain name and being independent of the protocol used to access the end-point;
a component in the server configured to receive over the second interface a look-up URI, the look-up URI comprising a tag identifying the look-up URI as a group look-up, the address of the apparatus, optional domain and group parameters; and
a component in the server configured to resolve the look-up URI to one or more first or second abstract URIs.

10. A method comprising:
communicating over a first interface with end-points operationally connected to the apparatus using a binary web service, the end-points comprising one or more resources;
communicating with web applications making use of the resources over a second interface;
forming a group comprising one or more end-points or other groups;
creating a first abstract universal resource identifier (URI) for the group to be used over the second interface, the abstract URI comprising a domain name and a group identifier and being independent of the protocol used to access the resources of the end-points of the group;
creating a second abstract universal resource identifier (URI) for the end-points to be used over the second interface, the abstract URI comprising an end-point and domain name and being independent of the protocol used to access the end-point;
receiving over the second interface a look-up URI, the look-up URI comprising a tag identifying the look-up URI as a group look-up, the address of the apparatus, optional domain and group parameters; and
resolving the look-up URI to one or more first or second abstract URIs.

11. The method of claim 10, further comprising:
creating universal resource locators (URL) for resources of the end-points to be used over the first interface, the URLs comprising the protocol used to access the resource, the Internet Protocol address, port and path of the resource; and
linking the URLs and the second abstract URIs together.

12. The method of claim 10, further comprising resolving a look-up URI to a linked second abstract URI if the received look-up URI points to a resolvable address, and otherwise to first look-up URI.

13. The method of claim 10, further comprising resolving a look-up URI to a JavaScript Object Notation object comprising one or more arrays of responses.

14. The method of claim 10, further comprising:
receiving over the second interface a request, the request comprising a domain name and a group identifier and optional parameters;
resolving the members of the group; sending the request to the members;
receiving response from the members; and
sending a response to the sender of the request.

15. The method of claim 14, further comprising:
receiving a request comprising an indicator that the request should be executed by the members of the group simultaneously;
determining an individual time-out for each member; and
sending the request to the members of the group with a time-out instructing each member to execute the request when the time-out has expired.

16. The method of claim 14, further comprising:
receiving a request comprising an indicator that the request should be executed by the members only if all members receive the request;
sending the request to the members of the group with a tag or group id indicating to the members that they should acknowledge the request but not execute it yet;
receiving acknowledgements from the members; and
sending a message to the members to execute the request if all members acknowledged the request.

17. The method of claim 10, further comprising creating, modifying or deleting a group on the basis of a request received over the second interface.

18. A method comprising:
communicating with a server operationally connected to a number of end-points using a binary web service, the end-points comprising one or more resources;
sending to the server over an interface a look-up universal resource identifier (URI), the look-up URI comprising a tag identifying the look-up URI as a group look-up, the address of the server, optional domain and group parameters, wherein the group comprises one or more end-points or other groups; and receiving, after an unspecified time-out, one or more first abstract universal resource identifiers (URI) of a group and/or one or more second abstract universal resource identifiers (URI) of an end-point, the first abstract URI comprising a domain name and a group identifier and being independent of the protocol used to access the resources of the end-points of the group, and the second abstract URI comprising an end-point and domain name and being independent of the protocol used to access the end-point.

19. A non-transitory computer readable storage medium comprising a set of instructions, which, when executed by a processor, causes the processor to:

communicate over a first interface with end-points using a binary web service, the end-points comprising one or more resources;

communicate with web applications making use of the resources over a second interface;

form a group comprising one or more end-points or other groups;

create a first abstract universal resource identifier (URI) for the group to be used over the second interface, the abstract URI comprising a domain name and a group identifier and being independent of the protocol used to access the resources of the end-points of the group;

create a second abstract universal resource identifier (URI) for the end-points to be used over the second interface, the abstract URI comprising an end-point and domain name and being independent of the protocol used to access the end-point;

receive over the second interface a look-up URI, the look-up URI comprising a tag identifying the look-up URI as a group look-up, the address of the apparatus, optional domain and group parameters; and resolve the look-up URI to one or more first or second abstract URIs.

* * * * *